US010613702B2

(12) United States Patent
Sudhakar Palla et al.

(10) Patent No.: US 10,613,702 B2
(45) Date of Patent: *Apr. 7, 2020

(54) RENDERING VIDEO OVER MULTIPLE WINDOWS

(71) Applicant: International Business Machines Corporation, Armonk, NY (US)

(72) Inventors: Pramod K. Sudhakar Palla, Pune (IN); Nitendra Rajput, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,054

(22) Filed: Jul. 30, 2018

(65) Prior Publication Data

US 2019/0012043 A1 Jan. 10, 2019

Related U.S. Application Data

(63) Continuation of application No. 14/748,669, filed on Jun. 24, 2015, now Pat. No. 10,108,309, which is a (Continued)

(51) Int. Cl.
*G06F 3/0481* (2013.01)
*G06F 3/14* (2006.01)
(Continued)

(52) U.S. Cl.
CPC ............. *G06F 3/0481* (2013.01); *G06F 3/00* (2013.01); *G06F 3/04842* (2013.01); *G06F 3/14* (2013.01);
(Continued)

(58) Field of Classification Search
CPC .. G06F 3/0481; G06F 3/1423; G06F 3/04842; G06F 3/00; G06F 3/14; G09G 2340/125; G09G 5/14
See application file for complete search history.

(56) References Cited

U.S. PATENT DOCUMENTS 4,868,765 A 9/1989 Diefendorff
5,721,849 A 2/1998 Amro
(Continued)

FOREIGN PATENT DOCUMENTS

| CN | 1404685 A | 3/2003 |
| CN | 101493837 A | 7/2009 |
| EP | 0767419 A1 | 4/1997 |

OTHER PUBLICATIONS

Office Action (dated Sep. 5, 2017) for U.S. Appl. No. 14/748,669, filed Jun. 24, 2015.
(Continued)

*Primary Examiner* — Shourjo Dasgupta
(74) *Attorney, Agent, or Firm* — Schmeiser, Olsen & Watts, LLP; Mark Vallone

(57) ABSTRACT

A method and system for rendering a video. A selection, by a user, of two or more occluded videos of multiple occluded videos that include (i) video on a displayed first page occluded by one or more pages of multiple other pages opened and displayed and (ii) video on selected pages of the multiple other pages occluded by an opening of subsequent pages of the other pages. A selection by the user of a page of the multiple other pages on which to view the two or more occluded videos is received. The two or more occluded videos are transferred simultaneously to the selected page. The two or more occluded videos are displayed on the selected page for continuous viewing by the user.

20 Claims, 4 Drawing Sheets

Related U.S. Application Data continuation of application No. 13/343,265, filed on Jan. 4, 2012, now Pat. No. 9,069,374.

(51) Int. Cl.
*G06F 3/0484* (2013.01)
*G06F 3/00* (2006.01)
*G06F 3/01* (2006.01)
*G09G 5/14* (2006.01)

(52) U.S. Cl.
CPC .............. *G06F 3/1423* (2013.01); *G09G 5/14* (2013.01); *G09G 2340/125* (2013.01)

(56) References Cited

U.S. PATENT DOCUMENTS

| | | |
|---|---|---|
| 6,636,245 B1 | 10/2003 | Estipona |
| 6,760,048 B1 | 7/2004 | Bates et al. |
| 7,028,266 B2 | 4/2006 | Ben-Shachar et al. |
| 8,250,228 B1 | 8/2012 | Johansson |
| 9,069,374 B2 | 6/2015 | Sudhakar Palla et al. |
| 2004/0201627 A1 | 10/2004 | Maddocks et al. |
| 2006/0161861 A1 | 7/2006 | Holecek et al. |
| 2007/0260700 A1 | 11/2007 | Messer |
| 2008/0163317 A1 | 7/2008 | Mills |
| 2011/0134218 A1 | 6/2011 | Neuman et al. |
| 2011/0145744 A1 | 6/2011 | Haynes et al. |
| 2011/0166918 A1 | 7/2011 | Allaire et al. |
| 2011/0225542 A1 | 9/2011 | Schmeider et al. |
| 2012/0023395 A1 | 1/2012 | Pieczul et al. |
| 2012/0042275 A1 | 2/2012 | Neerudu et al. |
| 2013/0002710 A1 | 1/2013 | Ratnakar et al. |

OTHER PUBLICATIONS

Amendment (dated Dec. 4, 2017) for U.S. Appl. No. 14/748,669, filed Jun. 24, 2015.
Final Office Action (dated Mar. 28, 2018) for U.S. Appl. No. 14/748,669, filed Jun. 14, 2015.
Final amendment (dated May 29, 2018) for U.S. Appl. No. 14/748,669, filed Jun. 24, 2015.
Notice of Allowance (dated Jun. 15, 2018) for U.S. Appl. No. 14/748,669, filed Jun. 24, 2015.
Office Action (dated Mar. 27, 2013) for U.S. Appl. No. 13/343,265, filed Jan. 4, 2012.
Office Action (dated Jun. 26, 2013) for U.S. Appl. No. 13/343,265, filed Jan. 4, 2012.
Office Action (dated Sep. 30, 2013) for U.S. Appl. No. 13/343,265, filed Jan. 4, 2012.
Amendment (dated Nov. 27, 2013) for U.S. Appl. No. 13/343,265, filed Jan. 4, 2012.
Final Office Action (dated Mar. 24, 2014) for U.S. Appl. No. 13/343,265, filed Jan. 4, 2012.
Final Amendment (dated May 28, 2014) for U.S. Appl. No. 13/343,265, filed Jan. 4, 2012.
Advisory Action (dated Jun. 15, 2014) for U.S. Appl. No. 13/343,265, filed Jan. 4, 2012.
RCE (Jun. 24, 2014) for U.S. Appl. No. 13/343,265, filed Jan. 4, 2012.
Notice of allowance (dated Feb. 24, 2015) for U.S. Appl. No. 13/343,265, filed Jan. 4, 2012.

RENDERING VIDEO OVER MULTIPLE WINDOWS

This application is a continuation application claiming priority to Ser. No. 14/748,669, filed Jun. 24, 2015, now U.S. Pat. No. 10,108,309, issued Oct. 23, 2018, which is a continuation of application Ser. No. 13/343,265 filed Jan. 4, 2012, U.S. Pat. No. 9,069,374, issued Jun. 30, 2015.

TECHNICAL FIELD

The present invention relates generally to the display of video on a computer, and more specifically, to watching video and web video content over multiple windows on a computerized device.

BACKGROUND

The Internet is a popular means for distributing and viewing video content from a wide variety of media sources, as well as user generated video content. A variety of different types of videos from various sources may be displayed on a computerized device. For instance, displayed videos may include video advertisements, recorded broadcast videos (e.g., news broadcasts, cable and/or television shows and stations, etc.), user generated videos (e.g., videos created and uploaded to a particular website by an individual), and even real-time data streaming videos (e.g., live news coverage, video conferencing, etc.).

A user will often open and view a video within a window of a computerized device. The window may contain one or more programs that allow executing several programs simultaneously (i.e., allows multitasking), and may include one or more tabs within each window. After the video is opened in the first tab, and perhaps even while the video is being played, the user may open another tab within such window, or even open a different window on the computerized device. For instance, the user may receive a chat message and go to chat, or decide to open another tab, or even go to email. In such an event, the video that is opened and being played in the first tab becomes occluded (i.e., obstructed), such that, the user is not able to view such video. The occlusion of the video may also cause the video to stop playing all together.

Once a video becomes occluded the user will miss out watching the content of the Video until the user goes back to the window that has the video. By the time the user goes back to this window/tab, the video would have advanced much further and so the user will have to replay the video from where he had left earlier, typically through a manual process. In instances where the video was buffered from the Internet, the user will have to buffer that piece of the video again.

In other instance, once a video becomes occluded the user may need to browse back and forth amongst the various open tabs and/or windows to view the opened video. When the tab or window having the previously viewed video has been reopened, the user may find that the video has stopped playing, or the user may need to search for the video if the page has moved onto a next video within a sequence of videos. Often, if the user needs to reopen the video, such video does not open at the location where the video stopped playing. Rather, the video is loaded from its beginning and the user must watch the entire video again.

In other instances, the user may open several windows on the computerized device and have different videos playing simultaneously in the different windows. The user may also need to browse back and forth amongst the different open windows to watch the videos being played thereon, such that, the user will miss portions of videos being played on the windows not being currently viewed.

Accordingly, there continues to be a need in the art for computer-implemented methods, apparatus, and computer program codes for rendering videos watched in a multi-window computer system where people watch items over multiple windows and/or tabs.

SUMMARY

According to one embodiment of the present invention, the invention is directed to a computer-implemented method of rendering a video by viewing a first page having visual content on a computerized device and then viewing a second page on the computerized device subsequent to the viewing of the first page. In so doing, the second page occludes display of the visual content on the first page. Source location of the visual content is then identified from the source code of the first page, and such source location of the visual content is retrieved. This source location of the visual content is input into source code of the second page to transfer the visual content to the second page. The visual content may then be displayed on the second page.

In other embodiments, the invention is directed to a computer program product for rendering a video. The computer program product includes a computer readable storage media and a first, second, third and fourth program instructions that are all stored on such computer readable storage media. The first program instructions identify source location of visual content from within source code of a first page open on a computerized device, the visual content being occluded by the opening of a second page on the computerized device. The second program instructions retrieve the source location of the visual content. The third program instructions input the source code of the visual content into source code of the second page to transfer the visual content to the second page. The fourth program instructions display the visual content on the second page.

In still other embodiments, the invention is directed to a computer system that includes a central processing unit (CPU), a computer readable memory, and a computer readable storage media. The computer system also includes a first, second, third and fourth program instructions that are all stored on the computer readable storage media for execution by the CPU via the computer readable memory. The first program instructions identify source location of visual content from within source code of a first page open on a computerized device, the visual content being occluded by the opening of a second page on the computerized device. The second program instructions retrieve the source location of the visual content. The third program instructions input the source location of the visual content into source code of the second page to transfer the visual content to the second page. The fourth program instructions display the visual content on the second page.

BRIEF DESCRIPTION OF THE SEVERAL VIEWS OF THE DRAWINGS

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

Figure 1A:
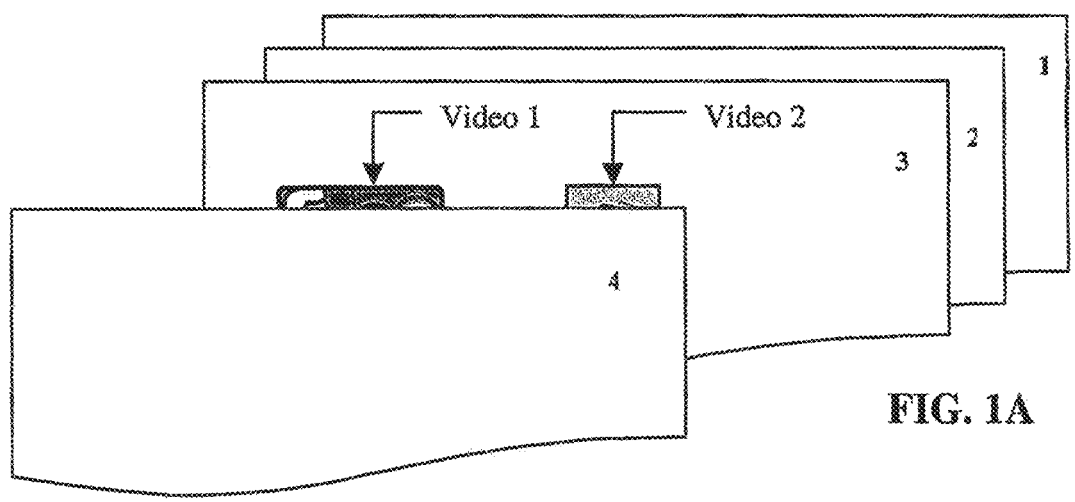
FIG. 1A is a representation of a number of different pages with one or more videos on selected pages occluded by subsequently viewed or opened pages.

Reference is made herein to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative. Likewise, reference to "the invention" shall not be construed as a generalization of any inventive subject matter disclosed herein.

Generally, when a user is watching a video on a first page of a computerized device, and then clicks on another page (i.e., another tab within such first window or opens a new window), the video being watched on the first page becomes occluded. That is, the newly opened page obstructs viewing of the video residing and playing on the first page. The various embodiments of the invention provide methods, systems, and computer program products that prevent video and/or audio that is currently being viewed and/or listened to from being obstructed by subsequently opened page(s). The methods, systems, and computer program products of the invention enable video and/or audio that is currently being watched, or listened to, to be carried forward to newly opened pages (i.e., those pages that are viewed subsequently) so that viewing, and listening to, of such video may continue.

While not meant to be limiting, for ease of understanding the various embodiments of the invention, the term occluded as used herein refers to digital content that is either obstructed or blocked from the user's vision and/or hearing, as well as content that has ceased playing or operating all together, due to opening of a new page(s). The term page as used herein refers to both a window and a tab on the computerized device. Such a window may include a tab, or even one or more tabs that are simultaneously opened in the window. Also, the pages may be two different windows, each having one or more tabs, simultaneously opened on the computerized device. As used herein the term content refers to digital data relating to, but not limited to, visual, audio, or both visual and audio digital data. For instance, visual content may include a silent video being watched on the computerized device (i.e., without sound), audio content may be a song being played, and both visual and audio content may include non-silent videos that include both visual and auditory outputs (e.g., a music video, a movie, a news clip, real-time video conferencing, etc.)

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, and/or components, but do not preclude the presence or addition of one or more other features, integers, steps, operations, elements, components, and/or groups thereof.

As will be appreciated by one skilled in the art, aspects of the present invention may be embodied as systems, methods or computer program products. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, store, communicate, propagate, or transport a program for use by or in connection with an instruction execution system, apparatus, or device. Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk. C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process. The instructions that execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud that allow video and/or audio to be transferred from one window/tab to another window/tab.

For example, the hardware, software, networking, connectivity, services, etc. of the cloud computing environment provide a user with the online service(s) of continuously viewing a video regardless of the window/tab the user is viewing by transferring such video(s) from its original window/tab (e.g., from its original URL) to the window/tab that such user is currently viewing. Cloud computing identifies and locates the video to its exact source location within the source code of the window/tab on which such video resides, copies the source location of the video and uploads it to a window/tab that is currently being viewed by the user so that the user is provided with the service of viewing the video(s) in a non-occluded manner. When hosted in a cloud environment, browsers are modified to accept applications in the cloud environment for offering and implementing the services of the various embodiments of the invention.

Referring now to the drawings, FIG. 1A is a representation of a number of different Pages open on a computerized device. Again, as the term Pages is used herein, these Pages may be different windows 1, 2, 3, 4, etc. or different tabs 1, 2, 3, 4, etc. within an open window. Page "3" is shown having two different videos, i.e., Video 1 and Video 2. Alternatively, Video 1 may be on a different Page than that of Video 2. Either one or both of these Videos 1, 2 may be playing on their respective Page. Once the user opens Page "4", which again may be another tab or another window, both Video 1 and Video 2 become occluded. In such an event, the user is unable to view Video 1 and Video 2 since both are obstructed by Page "4," or one or both of Videos 1 and 2 have stopped playing by the opening of Page "4."

Figure 1B:
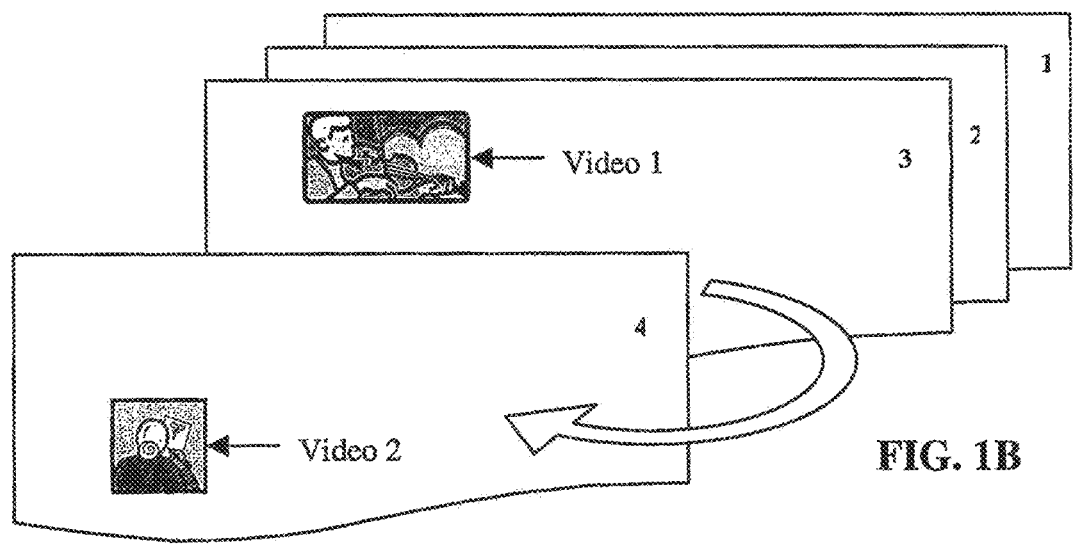
FIGS. 1B-C are representations of different pages showing occluded videos being transferred to a subsequently viewed or opened page for the non-occluded viewing of such video in accordance with the various embodiments of the invention.

To avoid video occlusion by subsequent Page opening as shown in FIG. 1A, the various embodiments of the invention enable a video from a previous open Page to be attached and transferred to a subsequently open Page for viewing thereon. Referring to FIG. 1B, a previously open Page (e.g., Page "3") may have one or more videos thereon. At least one or more of these videos may be opened and playing on such previous Page. When the user opens a new Page (e.g., Page "4"), at least one or more of the Videos that are open and playing on the previous Page (e.g., Page "3") moves with the newly opened Page (e.g., Page "4").

Figure 1C:
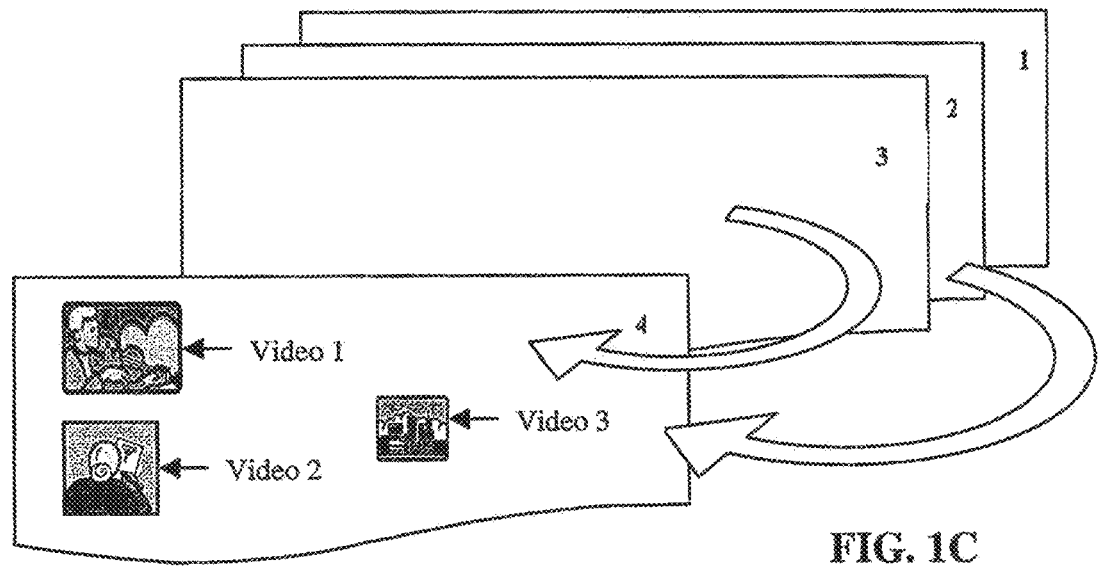

FIG. 1B shows at least one of the Videos (e.g., Video 2) moving with the newly opened Page (e.g., Page "4"). However, depending upon the particular preferences chosen by the user, more than one video may be attached to another open Page, including videos from different Pages being attached to a single newly opened Page. FIG. 1C shows multiple videos being transferred to the newly opened Page (e.g., Page "4"). For instance, one or more videos may be transferred to the new Page (e.g., Page "4") from a first Page (e.g., Videos 1, 2 from Page "3"), and still other videos may be transferred from a second Page (e.g., Video 3 from Page "2").

For ease of understanding the invention reference is made herein to the video being transferred to a newly opened Page or subsequently opened Page. However, it should be appreciated and understood that the video(s) may be transferred to a currently viewed Page within a sequence of opened Pages. The user may select a desired Page (or Pages) from a number of different Pages to transfer the one or more Video's thereto. In this manner, the user may browse back and forth amongst a number of different Pages while still being able to view the video(s) throughout the entire time of browsing different Pages.

For instance, if a user has five (5) different Pages open on the computerized device, the user may select an option on the device that transfers the video(s) selected by the user to be transferred to a specific one of such five (5) different Pages. As an example, and not meant to be limiting, if the user has five (5) different search windows open, with one or more of such search windows having video(s), and the fifth open window is an e-mail window, the user may select an option that transfers one or more selected videos to the user's e-mail window so that the user can watch the video(s) while checking e-mail. As such, when the user goes to check e-mail, the switching from a first window having video to a second window having e-mail does not occlude or obstruct the video of the first window. Rather, such video is transferred to the second window for viewing by the user.

In accordance with the various embodiments of the invention, the Page that video is transferred to may be a last opened Page (i.e., last opened window/tab), or it may reside within a sequence of Pages (i.e., windows/tabs) opened by the user. In alternate embodiments, rather than the user selecting which Page the video is to be transferred to, by a default setting the video(s) may automatically be transferred to a last opened Page within a sequence of opened Pages, or even to all the Pages within such sequence of Pages with an option of viewing by the user at each Pages. That is, the user does not have to view the video on the Page(s) to which it is transferred to, rather, the user may have an option of viewing such video(s) thereon (e.g., by selecting a view video option key).

Figure 2A:
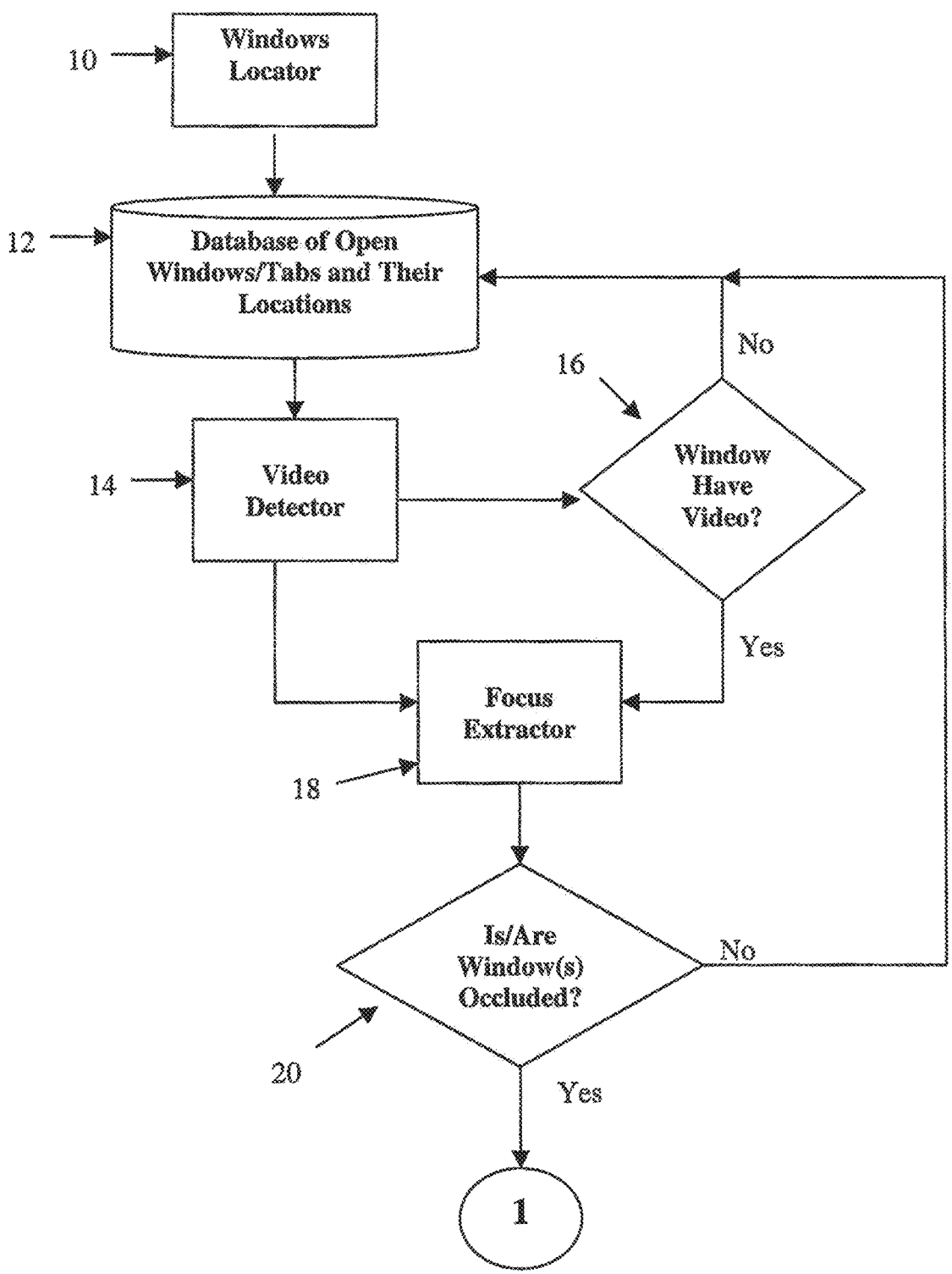
FIGS. 2A-B illustrate flowcharts of exemplary process flows and steps of rendering a non-occluded video on a page in accordance with the various embodiments of the invention.
Figure 2B:
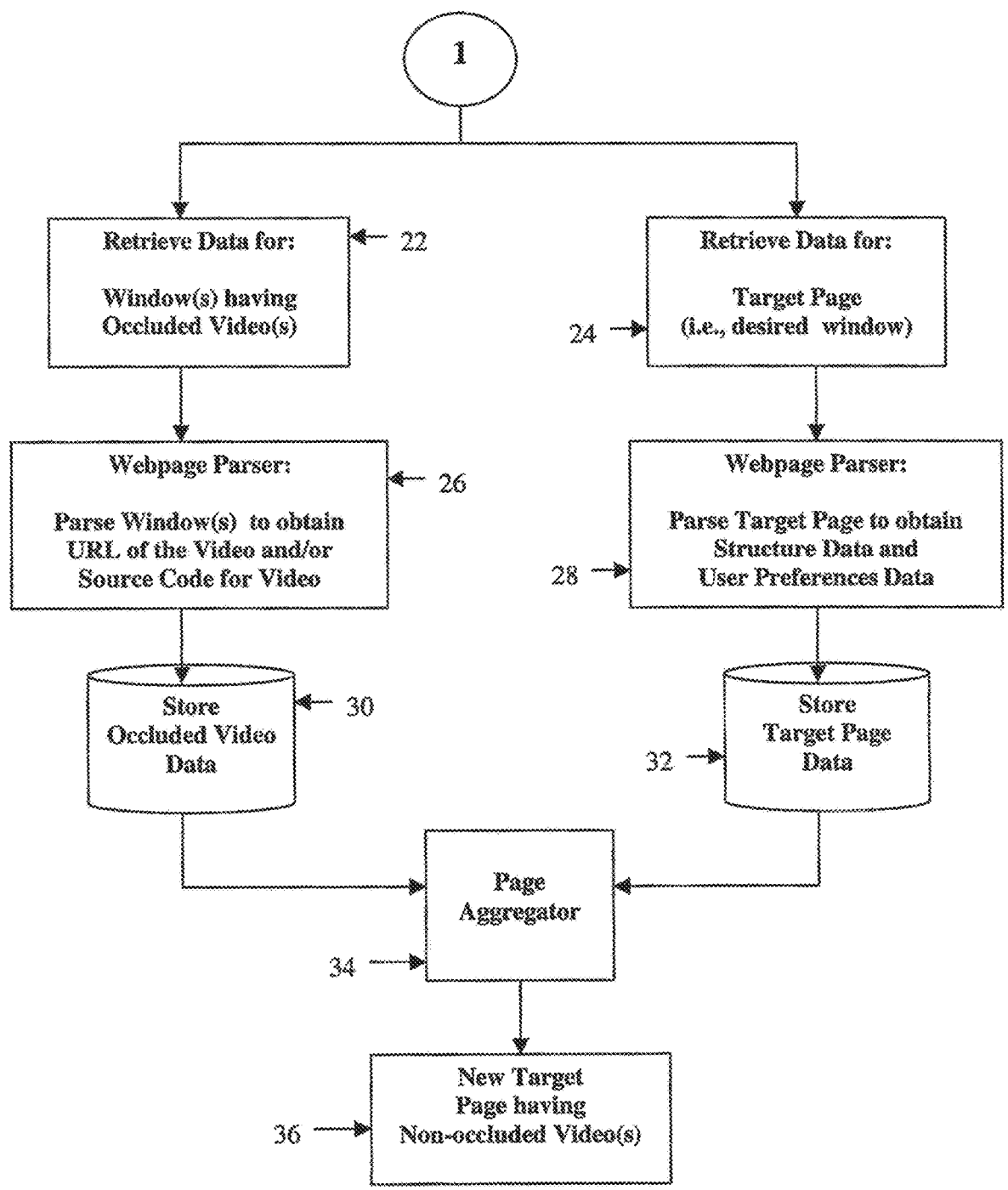

Referring to FIGS. 2A-2B, a process flow of the invention is shown for transferring video to a desired or currently open Page (window or tab) in accordance with one or more embodiments of the invention.

Upon starting the present methods, systems and program products of the invention a windows locator 10 component locates open Pages on the computerized device. Again, these Pages may be different open windows, or one or more open tabs within one or more open windows. In one or more embodiments, the located open Pages may be all open Pages on the computerized device (i.e., every open Page). In other embodiments the located open Pages may be only those Pages that have been specifically chosen or designated by the user. That is, the user may select certain Pages of interest having video(s) that is to be transferred to a desired end-result Target Page.

The Windows Locator 10 uniquely identifies each open Page and its corresponding page location. The Page identification may include the Page's URL or address where it can be located either on the computerized device or on the Internet. Data identifying the open Pages and their locations is stored in a first Database 12 of the invention. Again, the stored Page identifications may be URL's or addresses of windows and/or tabs opened in a previously opened Page, or those that are selected by the user.

A Video Detector 14 component retrieves all of the Pages stored within the Database 12, including all information relating to Page identification and location. The Video Detector 14 retrieves each Page's digital data, and may organize and sort such pages in the chronological order or sequence in which such Pages were opened. Optionally, the retrieved Pages may be organized and sorted in chronological order or sequence by a Focus Extractor 18 of the invention discussed further below.

A Query 16 is performed on the retrieved Page data. This Query 16 may be performed by a component residing within the Video Detector 14, or it may be performed by a component separate from the Video Detector 14. Query 16 determines whether or not each Page retrieved by the Video Detector 14 contains one or more videos and/or audio. In particular, it is determined whether any of the Pages from the Video Detector 14 have a video/audio playing, is on pause, or has stopped playing. Typically, video displays include audio (e.g., a music video), and audio includes visual displays (e.g., the stop, pause and play controls, volume control, tremble control, etc.) In the various embodiments, all of such visual and auditory signals are located and identified for transferring to a different Page in accordance with the invention.

If there are no Pages having video and/or audio, then the process flows back to Database 12 to continue processing for any subsequently opened Pages by the user. That is, the invention may run continuously so that it is implemented on all Pages opened by the user during the user's current session on the computerized device. The stored data may also be saved for a later session and retrieved once the user signs into a new session on the device.

Referring to Query 16, if it is determined that certain Pages from the Pages retrieved by the Video Detector 14 do have video and/or audio playing, paused or stopped, those Pages having such video and/or audio are identified. Information relating to the identity (e.g., URL) of such Pages having video and/or audio is passed to the Focus Extractor 18 component of the invention. Also sent to the Focus Extractor 18 is a complete list of all Pages retrieved by the Video Detector 14. Again, the Video Detector 14 may sort the Pages in chronological order in which they were opened, or the Focus Extractor 18 may chronologically sort such Pages.

Identification of the Pages having video and/or audio and the list of chronologically sorted Pages is analyzed via Query 20. This analysis determines whether any of the identified Pages that include video/audio have one or more video(s)/audio that is occluded by a subsequently opened Page. The query component 20 may reside within the Focus Extractor 18 or may be a component separate thereto.

In particular, once the list of chronologically open Pages has been generated, those Pages identified as having video and/or audio are compared against the chronological list to determine which one(s) of such Pages have video/audio occluded by the opening of a subsequent Page. That is, occluded videos are detected and the Page on which such occluded video/audio resides is identified. These occluded video(s) and/or audio may have been open and playing, and then subsequently occluded by the opening of a next Page. Alternatively, the video/audio may have been paused with the intent to resuming playing at a later time, or even stopped playing all together. Both paused and stopped videos may be occluded by the subsequent opening of another Page.

Once the list of occluded video(s) and/or audio is determined and generated, Data Fetcher 22 retrieves digital data of the Page having the occluded video and/or audio. This data contains the location of the occluded video and the amount of time for which it had been played before being occluded. Another Data Fetcher 24 retrieves digital data of a Target Page 36. The Target Page 36 is the end result Page that the occluded video and/or audio is to be transferred to for viewing or playing thereon.

A Webpage Parser 26 analyzes the occluded video Page's digital data from Data Fetcher 22 to retrieve and identify source location for the occluded video. In doing so, a beginning and an end (i.e., start and stop) of the occluded video may be determined, such locations identified, and then stored in a Database 30. The particular Page's location and identification (e.g., a URL) may also be stored in the Database 30. Alternatively, if the occluded video was paused or stopped, the point at which such video was paused or stopped may be determined along with an end time of the video. Both the time at which the video was paused or stopped (e.g., a specific time or amount of time into play of the video) and the end time of the video are identified and stored in Database 30. In one or more embodiments, a plurality of occluded video's from one or more Pages may have their source locations identified (e.g., start and end of each video, timed point at which video was paused/stopped with end time, etc.), with such plurality of occluded video data all being stored in Database 30.

Webpage Parser 28 analyzes the digital data of the Target Page 36 from Data Fetcher 24. In doing so, the source code and digital data structure of the Target Page 36 are determined and stored in Database 32. The source code and digital data structure of the Target Page 36 may include an identification of one or more locations on the Target Page where the occluded video(s) may be viewed on such Target Page. The user may have the option of selecting where the video is to be viewed on the Target Page 36. That is, the location of where video's are to be displayed on the Target Page, selected ones of a number of videos to be displayed, as well as the order in which to display videos all may be chosen by the user according to the user's preferences. Alternatively, exact locations for viewing video may be set by default by the Target Page's source code. Also, the Target Page may be provided with source code (i.e., instructions) that set the order and priority of viewing certain videos from a number of videos that may be transferred to such new Target Page. For instance, where multiple videos are occluded and transferred to the Target Page, the invention may give a highest priority to a live streaming video (e.g., live/real-time chat with one or more individuals (i.e., video conferencing, skype, etc.), all of such individuals' video being moved simultaneously for continuous viewing of all by the user), a next highest priority to recorded streaming video (e.g., youtube videos), a subsequent highest priority to videos played locally from the computerized device, and so on. Of course, the user may always change such settings based on the desired user's preferences.

In order to view the occluded video(s) on the Target Page 36, a Page Aggregator 34 receives the occluded video(s) data from Database 30, the source code and digital data structure of the Target Page 36 from Database 32, and any selected user preferences. Using the occluded video(s) data, the Page Aggregator 34 retrieves the occluded video(s) from its identified location on the Page it was identified as residing on. The retrieved data may be the source location of such occluded video(s). Source location refers to the particular location from which the occluded video is fetched. Often, a video may not be contained in the source code of the webpage, but rather has a link to the source location of the video that resides on a different page. This link to the source location of the video may be fetched and uploaded into the source code of the second page. For instance, the source location may be fetched from a specific URL from which a webpage embeds the video in (e.g., http://www.youtube.com/watch?v=trFfrOiCSWQ), it may be fetched from a specific storage unit on the end-user's computing device, or it may be fetched from a streaming application such as in a video chat system such as Skype. The content that gets transferred is the location and time of the video that was played in the previous window. The link of the location is embedded into the new target page, along with any additional code that helps to embed the video in such target page.

The Page Aggregator 34 may retrieve the entire video(s) or only a portion of the video. Alternatively, where multiple videos have been identified as being of interest to be transferred to a later opened Page, selected ones of such videos may be transferred in their entireties while others are transferred in portions thereof.

The Page Aggregator 34 also retrieves the source code and digital data structure of the Target Page 36. An exact location of where the videos are to be transferred onto the Target Page 36 may be included within the Target Page's source code and digital data structure retrieved by the Page Aggregator 34. Alternatively, the location may be set by the user preferences. The Page Aggregator 34 then uploads the source location and required code of the occluded video(s) into the identified location within the Target Page's source code and digital data structure. This uploading and inclusion of source location modifies the desired end page (i.e., the original source code of the target page) to result in a new Target Page 36 having source location of the non-occluded video(s). The one or more videos are transferred to this new Target Page 36 to render viewing of such video(s) in a non-occluded manner.

In accordance with the various embodiments of the invention, a user is able to continuously watch a video when opening a new tab or window (i.e., the new Target Page 36) since the video is transferred to such new tab or window. The user may also transfer one or more videos to this new Target Page 36 from one or more different tabs or different windows. Again, in one or more embodiments the new Target Page may be a most currently opened tab/window. Since portions of videos may be transferred to the new Target Page 36, the user may watch a video from a previously viewed Page on this new Target Page not just at the beginning of such video but also starting from any portion of the video. For instance, the user may be able to watch the video from the point in the video where it was stopped in the previous window or tab. As such, the video, either in its entirety or any portion thereof, will not be lost when the user goes from one Page to another on the device. The user is also able to multi-task on this new Target Page 36 by watching a video from a previous Page as well as performing tasks original to such Target Page (e.g., check e-mail, browse, shop, chat, instant message, online video chat, etc.).

It should be appreciated and understood that the invention is not only for the transfer of pre-recorded videos or videos stored online, but also includes the transfer of online video chat capabilities to a currently viewed Page, which may be a most recently opened Page. For instance, real-time video chat conferencing may be automatically moved and transferred to a most currently viewed Page. While reference has been made herein to the Page being a most recently opened Page, it should be appreciated and understood that the Page may be a most currently viewed Page from a number of opened Pages, whereby the video(s) is transferred back and forth amongst these various opened Pages so that the video(s) may be viewed at all times by the user. That is, the video(s) may be sequentially transferred in a sequence that corresponds to the sequence in which the user views the number of different tabs/windows.

The various embodiments of the invention carry and save both video and audio (e.g., songs) over multiple tabs or windows to avoid video occlusion by other tabs or windows. The video may be saved and carried over at a particular time point within such video so that the user may watch or resume play at such particular point or time within the video. That is, a time for which the visual content in the first page was played before being occluded may be identified followed by inputting the source location of the visual content and the time played into source code of the second page. A user may then watch the visual content on the second page from the point at which the video was occluded (i.e., from the identified time played) forward. This time played may be a time t=0 when the video has not started playing, or it may be t=X whereby X refers to any point or location within the video after it play thereof has started. In various embodiments, regardless of the time played being identified and then transferred to the second page, the entirety of the video may be transferred to the second page so that the user may watch such video from the time played "t" or the user may watch the video from the beginning by using the video slider to start such video from the beginning. The invention also provides the user with controls to set particular preferences for both selecting and viewing desired video(s) and/or audio.

Figure 3A:
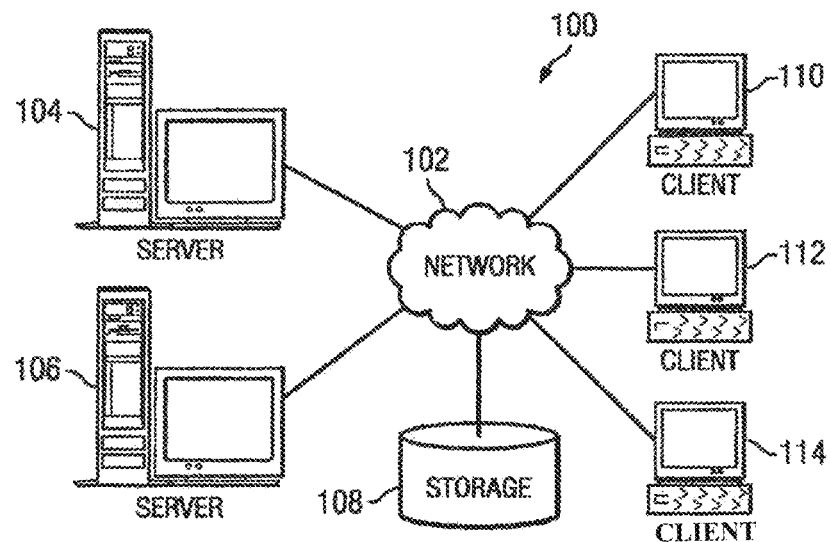
FIGS. 3A-B illustrate exemplary diagrams of data processing environments in accordance with the various embodiments of the invention.
Figure 3B:
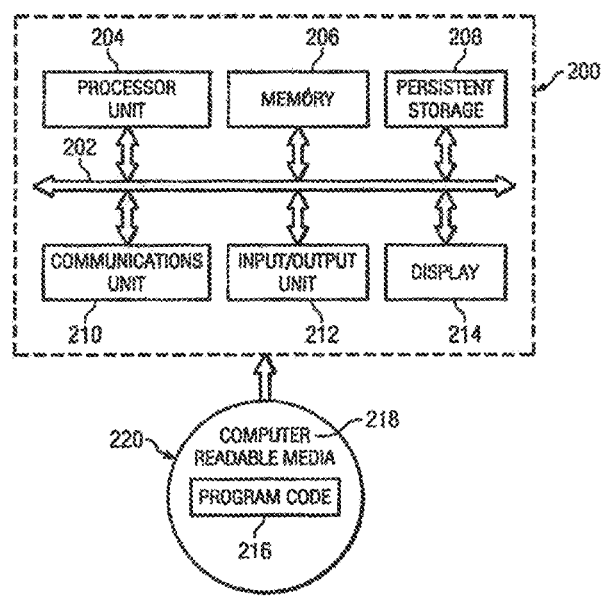

Exemplary diagrams of data processing environments are shown in FIGS. 3A-B in which embodiments of the invention may be implemented. It should be appreciated and understood that these drawings are only exemplary and are not intended to assert or imply any limitation with regard to the environments in which different embodiments may be implemented. Many modifications to the depicted environments may be made.

A representation of a network of data processing systems in which embodiments of the invention may be implemented are shown in FIG. 3A. Network data processing system 100 may be a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 (e.g., personal computers or network computers) connect to network 102. The servers may provide data, such as boot files, operating system images, and applications to clients 110, 112, and 114. Network data processing system 100 may include additional servers, clients, and other devices not shown. The program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN), or within a cloud computing environment. Again, these figures are meant to be examples and not as an architectural limitation for the different illustrative embodiments.

The block diagram of FIG. 3B illustrates a data processing system of certain embodiments of the invention. The data processing system 200 is an example of a computer, such as server 104 or client 110 in FIG. 3A, in which computer usable program code or instructions implementing the processes may be located. The data processing system 200 may include communications fabric 202, which provides communications between processor unit 204, memory 206, persistent storage 208, communications unit 210, input/output (I/O) unit 212, and display 214.

A central processing unit (CPU) 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210 provides for communications with other data processing systems or devices. In these examples, communications unit 210 may be a network interface card. Communications unit 210 may provide communications through the use of either or both physical and wireless communications links. Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 may be located in a functional form on computer readable media 218 that is selectively removable and may be loaded onto or transferred to data processing system 200 for execution by processor unit 204. Program code 216 (i.e., instructions) and computer readable media 218 form computer program product 220 in these examples. The computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

Again, these examples of the data processing system 200 are not meant to be limiting. Rather, the data processing system 200 may be implemented in various forms. For example, data processing system 200 may be a computer, a workstation, a laptop computer, a mobile phone, a personal digital assistant, or some other suitable type of data processing system. The various embodiments of the invention may be implemented using any hardware device or system capable of executing program code.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for rendering a video, said method comprising:
   receiving, by one or more processors of a computer system, a selection by a user of two or more occluded videos of a plurality of occluded videos comprising (i) video on a first page displayed on a computerized device, said video on the first page occluded by one or more pages of a plurality of other pages sequentially opened and displayed on the computerized device and (ii) video on selected pages of the plurality of other pages occluded by an opening of subsequent pages of the other pages;
   receiving, by the one or more processors, a selection by the user of a page of the plurality of other pages on which to view the two or more occluded videos;
   transferring simultaneously, by the one or more processors, the two or more occluded videos to the selected page; and
   displaying, by the one or more processors, the two or more occluded videos on the selected page for continuous viewing by the user.

2. The method of claim 1, said displaying comprising displaying the two or more occluded videos on the selected page for continuous viewing by the user while the user is multitasking on the selected page.

3. The method of claim 1, said method comprising:
   identifying and retrieving, by the one or more processors, a source location of each occluded video of the two or more occluded videos; and
   inputting, by the one or more processors, the source location of each occluded video of the two or more occluded videos into source code of the selected page for implementing said transferring the two or more occluded videos to the selected page.

4. The method of claim 1, said method comprising:
   receiving, by the one or more processors, a selection by the user of an order of displaying the one or more occluded videos on the selected page.

5. The method of claim 1, wherein the selected page sets an order of displaying the two or more occluded videos on the selected page.

6. The method of claim 1, wherein a cloud computing system comprises the computer system.

7. The method of claim 1, wherein the video on the first page is selected from the group consisting of video being played on the first page, video paused on the first page, and video stopped on the first page.

8. A computer program product, comprising one or more computer readable hardware storage devices having computer readable program code stored therein, said program code containing instructions executable by one or more processors of a computer system to implement a method for rendering a video, said method comprising:
   receiving, by the one or more processors, a selection by a user of two or more occluded videos of a plurality of occluded videos comprising (i) video on a first page displayed on a computerized device, said video on the first page occluded by one or more pages of a plurality of other pages sequentially opened and displayed on the computerized device and (ii) video on selected pages of the plurality of other pages occluded by an opening of subsequent pages of the other pages;

receiving, by the one or more processors, a selection by the user of a page of the plurality of other pages on which to view the two or more occluded videos;

transferring simultaneously, by the one or more processors, the two or more occluded videos to the selected page; and displaying, by the one or more processors, the two or more occluded videos on the selected page for continuous viewing by the user.

9. The computer program product of claim 8, said displaying comprising displaying the two or more occluded videos on the selected page for continuous viewing by the user while the user is multitasking on the selected page.

10. The computer program product of claim 8, said method comprising:

identifying and retrieving, by the one or more processors, a source location of each occluded video of the two or more occluded videos; and inputting, by the one or more processors, the source location of each occluded video of the two or more occluded videos into source code of the selected page for implementing said transferring the two or more occluded videos to the selected page.

11. The computer program product of claim 8, said method comprising:

receiving, by the one or more processors, a selection by the user of an order of displaying the two or more occluded videos on the selected page.

12. The computer program product of claim 8, wherein the selected page sets an order of displaying the two or more occluded videos on the selected page.

13. The computer program product of claim 8, wherein a cloud computing system comprises the computer system.

14. The computer program product of claim 8, wherein the video on the first page is selected from the group consisting of video being played on the first page, video paused on the first page, and video stopped on the first page.

15. A computer system, comprising one or more processors, one or more memories, and one or more computer readable hardware storage devices, said one or more hardware storage device containing program code executable by the one or more processors via the one or more memories to implement a method for rendering a video, said method comprising:

displaying, by one or more processors of a computer system, a first page for a user on a computerized device, said first page comprising video;

receiving, by the one or more processors, a selection by a user of two or more occluded videos of a plurality of occluded videos comprising (i) video on a first page displayed on a computerized device, said video on the first page occluded by one or more pages of a plurality of other pages sequentially opened and displayed on the computerized device and (ii) video on selected pages of the plurality of other pages occluded by an opening of subsequent pages of the other pages;

receiving, by the one or more processors, a selection by the user of a page of the plurality of other pages on which to view the two or more occluded videos;

transferring simultaneously, by the one or more processors, the two or more occluded videos to the selected page; and displaying, by the one or more processors, the two or more occluded videos on the selected page for continuous viewing by the user.

16. The computer system of claim 15, said displaying comprising displaying the two or more occluded videos on the selected page for continuous viewing by the user while the user is multitasking on the selected page.

17. The computer system of claim 15, said method comprising:

identifying and retrieving, by the one or more processors, a source location of each occluded video of the two or more occluded videos; and inputting, by the one or more processors, the source location of each occluded video of the two or more occluded videos into source code of the selected page for implementing said transferring the two or more occluded videos to the selected page.

18. The computer system of claim 15, said method comprising:

receiving, by the one or more processors, a selection by the user of an order of displaying the two or more occluded videos on the selected page.

19. The computer system of claim 15, wherein the selected page sets an order of displaying the two or more occluded videos on the selected page.

20. The computer system of claim 15, wherein a cloud computing system comprises the computer system.

\* \* \* \* \*